United States Patent Office 2,835,678
Patented May 20, 1958

2,835,678

SOLUBLE ADRENOCHROME DERIVATIVES AND PROCESS OF PREPARATION THEREOF

Junichi Iwao, Tennoji-ku, Osaka-shi, Koichi Tomino, Senboku-gun, Osaka-fu, and Mitsutaka Kawazu, Higashiyodogawa-ku, Japan, assignors to Gohei Tanabe & Co., Ltd., a corporation of Japan No Drawing. Application September 25, 1956
Serial No. 612,064

Claims priority, application Japan October 18, 1955

10 Claims. (Cl. 260—319)

The present invention is directed to therapeutically valuable adrenochorme derivatives and to the process for preparing them. More particularly, the invention relates to the process of preparing 1-methyl-2,3,5,6-tetrahydro-5-semicarbazono-6-oxoindole-3-sulfonic acid, 1-methyl-2,-3,5,6 - tertahydro - 5 - hydroxyimino - 6 - oxoindole-3-sulfonic acid and their alkali metal salts.

It is known that adrenochrome is quite unstable and, therefore, not readily available for therapeutic applications. Certain derivatives of adrenochrome, particularly the monosemicarbazone and the mono-oxime thereof are stable and are applicable to the therapeutic uses of adrenochrome. However, such derivatives have the disadvantage of low solubility, and it has been impossible to prepare aqueous solutions of a concentration more than about 0.05% at 20° C. without the use of a large quantity of sodium salicylate as a solubilizer. Such sodium salicylate is either inert or becomes harmful to the therapeutic action of said derivative or to the organism to be treated.

It is also known that, when a solution of adrenochrome reacts upon an alkali bisulfite and then is condensed with semicarbazide or hydroxylamine, a water-soluble adrenochrome derivative, namely alkali metal 1-methyl-2,3,5,6-tetrahydro - 3 - hydroxy - 5 - semicarbazido (or hydroxyamino)-6-oxoindole-5-sulfonate is obtained. These addition compounds are soluble in water; however, it is difficult to prepare them in pure form. Furthermore their aqueous solution tends to be decomposed and colored on heating.

The present invention is intended and adapted to overcome the deficiencies of derivatives of adrenochrome, it being among the objects of this invention to provide derivatives which are therapeutically valuable and are substantially soluble in water without the necessity of the addition of solubilizers.

It is also among the objects of the invention to provide such derivatives of adrenochrome as are stable over long periods of time and which will not decompose on heating.

It is further among the objects of the invention to provide a process for the production of such derivatives which is novel, simple in operation and which results in high yields.

In practicing this invention, we have found that, when adrenochrome monosemicarbazone is treated with an aqueous solution of alkali metal bisulfite, substitution may take place in hydroxy radical of adrenochrome monosemicarbazone to form alkali metal 1-methyl-2,3,5,6-tetrahydro-5-semicarbazono-6-oxoindole-3-sulfonate, and the reaction product is more soluble in water than adrenochrome monosemicarbazone even without using such a solubilizer as sodium salicylate. The process consists in suspending the adrenochrome monosemicarbazone or its mono-oxime in a solution of a soluble bisulfite, usually an alkali metal bisulfite, and allowing the solution to stand for a sufficient length of time to permit the reaction to go to completion which is generally indicated by a change in color of the particles. Preferably, the reaction mass is saturated with sulfur dioxide and usually the application of some heat is desirable to maintain a temperature substantially above room temperature.

The treatment with an alkali metal bisulfite may be carried out by adding adrenochrome monosemicarbazone or the oxime to an aqueous solution of alkali metal bisulfite such as sodium bisulfite or potassium bisulfite, stirring the solution at room temperature, and recovering the product. In the course of this process, if an aqueous solution of alkali metal bisulfite saturated with sulfur dioxide is used, an accelerated reaction period can be secured.

Free acids of these products, which are soluble in water and useful in therapeutics as are the alkali metal salts, may be obtained by acidifying the solution of the alkali metal salts and recovering the isolated products.

The free acids are represented by the following formulae:

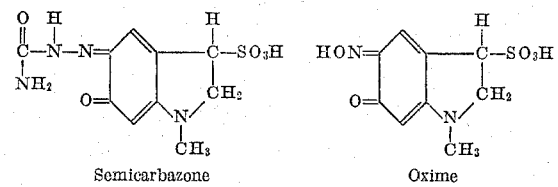

Semicarbazone            Oxime

The following examples are illustrative of the invention but are not to be construed as limiting the scope thereof:

Example 1

23.6 g. of adrenochrome monosemicarbazone is suspended in a solution of 20.8 g. of sodium bisulfite dissolved in 100 cc. of water, and then the suspension is stirred at 30° C. for 3 days. The color of the suspended particles is converted from red into orange yellow. When the particles are recovered by filtration and recrystallization from water and methanol, 37 g. of sodium 1-methyl - 2,3,5,6 - tetrahydro - 5 - semicarbazono - 6-oxoindole-3-sulfonate, decomposing at 227–228° C., is obtained.

Example 2

23.6 g. of adrenochrome monosemicarbazone is suspended in a solution of 24 g. of potassium bisulfite dissolved in 100 cc. of water saturated with sulfur dioxide, then stirred at 30° C. for 3 days. When the particles are recovered by filtration and recrystallization from water and methanol, 39 g. of potassium 1-methyl-2,3,5,6-tetrahydro-5-semicarbazono-6-oxoindole-3-sulfonate, which is stable up to 243° C., is obtained.

Example 3

19.6 g. of adrenochrome mono-oxime is suspended in a solution of 20.8 g. of sodium bisulfite dissolved in 100 cc. of water saturated with sulfur dioxide, then stirred at 30° C. for 3 days. When the particles are recovered by filtration and recrystallization from water, 28 g. of orange colored capillary crystals of sodium 1-methyl-2,3,5,6-tetrahydro-5-hydroxyimino-6-oxoindole-3-sulfonate is obtained.

Example 4

5 g. of sodium 1-methyl-2,3,5,6-tetrahydro-5-semicarbazono-6-oxoindole-3-sulfonate prepared by Example 1 is dissolved in 120 cc. of water. To this solution are added 7 cc. of 10% hydrochloric acid. 3.8 g. of pale yellow crystals of 1-methyl-2,3,5,6-tetrahydro-5-semicarbazono-6-oxoindole-3-sulfonic acid are obtained by filtering the isolated substance and washing with water. This acid darkens at 130° C. and decomposes at 195° C.

The products of the invention are readily obtained in high yield and pure form and are stable over long periods of time; their aqueous solutions which are clear orange-colored solutions are suitable for oral and parenteral administration, and they are not decomposed on heating. The products have an additional advantage, when administered, of showing a superior hemostatic activity over that of adrenochrome monosemicarbazone and sodium 1 - methyl - 2,3,5,6-tetrahydro-3-hydroxy-5-semicarbazido-6-oxoindole-5-sulfonate of equimolar proportion.

We claim:

1. Therapeutically valuable substances taken from the class consisting of 1-methyl-2,3,5,6-tetrahydro-5-semicarbazono-6-oxoindole-3-sulfonic acid, 1-methyl-2,3,5,6-tetrahydro-5-hydroxyimino - 6 - oxoindole-3-sulfonic acid, and the alkali metal salts of said acids.

2. Sodium 1 - methyl - 2,3,5,6 - tetrahydro-5-semicarbazono-6-oxoindole-3-sulfonate.

3. Potassium 1 - methyl - 2,3,5,6 - tetrahydro-5-semicarbazono-6-oxoindole-3-sulfonate.

4. Sodium 1-methyl-2,3,5,6-tetrahydro-5-hydroxyimino-6-oxoindole-3-sulfonate.

5. Potassium 1-methyl - 2,3,5,6 - tetrahydro-5-hydroxyimino-6-oxoindole-3-sulfonate.

6. Process for preparing therapeutically valuable substances taken from the class consisting of 1-methyl-2,3,5,6-tetrahydro-5-semicarbazono-6-oxoindole-3-sulfonic acid, 1 - methyl-2,3,5,6-tetrahydro-5-hydroxyimino-6-oxoindole-3-sulfonic acid, in the form of their alkali metal salts which comprises mixing a substance taken from the class consisting of adrenochrome monosemicarbazone and adrenochrome monooxime with an aqueous solution of an alkali metal bisulfite.

7. Process for preparing therapeutically valuable substances taken from the class consisting of 1-methyl-2,3,5,6-tetrahydro-5-semicarbazono-6-oxoindole-3-sulfonic acid, 1 - methyl-2,3,5,6-tetrahydro-5-hydroxyimino-6-oxoindole-3-sulfonic acid in the form of their alkali metal salts which comprises mixing a substance taken from the class consisting of adrenochrome monosemicarbazone and adrenochrome mono-oxime with an aqueous solution of an alkali metal bisulfite containing sulfur dioxide.

8. Process for preparing therapeutically valuable substances taken from the class consisting of 1-methyl-2,3,5,6-tetrahydro-5-semicarbazono-6-oxoindole-3-sulfonic acid, 1 - methyl-2,3,5,6-tetrahydro-5-hydroxyimino-6-oxoindole-3-sulfonic acid in the form of their alkali metal salts which comprises mixing a substance taken from the class consisting of adrenochrome monosemicarbazone and adrenochrome monooxime with an aqueous solution of an alkali metal bisulfite, and maintaining a temperature of about 30° C.

9. Process according to claim 6 in which said bisulfite is sodium bisulphite.

10. Process according to claim 6 in which said bisulfite is potassium bisulphite.

References Cited in the file of this patent

UNITED STATES PATENTS 2,180,801    Engel _____ Nov. 21, 1939